A. L. MURRAY.
REINFORCEMENT FOR PNEUMATIC TIRES.
APPLICATION FILED NOV. 27, 1908.
964,446. Patented July 12, 1910.
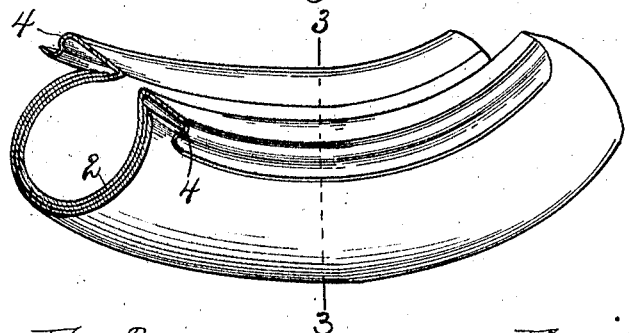
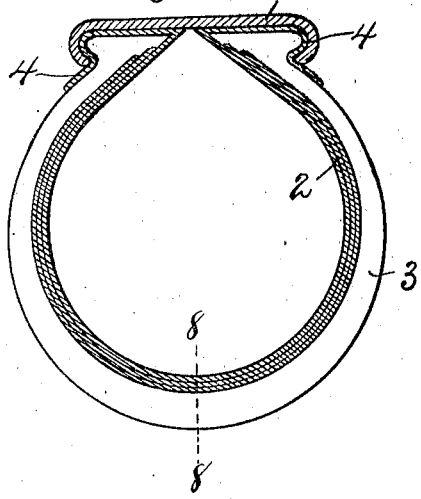 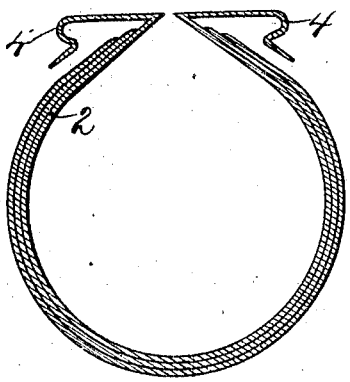
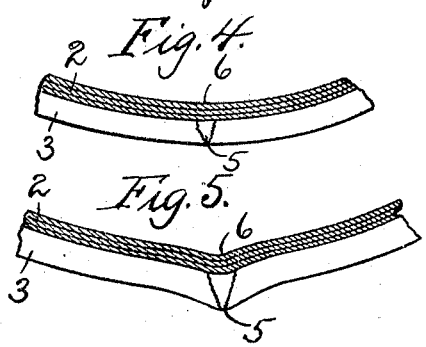 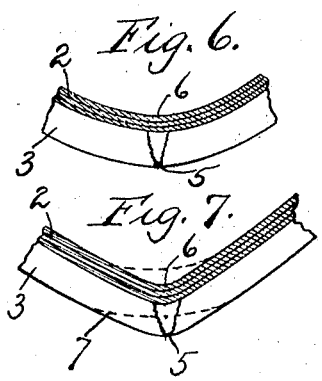
WITNESSES: INVENTOR

UNITED STATES PATENT OFFICE.

ALBERT LINN MURRAY, OF GRAND RAPIDS, MICHIGAN, ASSIGNOR OF ONE-HALF TO SHAWMUT TIRE COMPANY, A CORPORATION OF MASSACHUSETTS.

REINFORCEMENT FOR PNEUMATIC TIRES.

964,446.  Specification of Letters Patent.  Patented July 12, 1910.

Application filed November 27, 1908. Serial No. 464,576.

*To all whom it may concern:*

Be it known that I, ALBERT LINN MURRAY, a citizen of the United States, residing at Grand Rapids, in the county of Kent and State of Michigan, have invented certain new and useful Improvements in Reinforcements for Pneumatic Tires, of which the following is a specification.

My invention relates to improvements in what are known as blow-out patches or devices designed to enable blow outs or cuts in the outer cases or shoes of double tube pneumatic tires to be temporarily repaired.

The object of the invention is to provide such a patch which will be free from all metallic parts or retaining devices, will be strong and durable, which will make the repaired tire ride smoothly, and which may be easily and quickly applied and which prevents the blowing out of the inner tube irrespective of the size or location of the damaged portion of the outer case, and which will not project or bulge into the rupture in the outer case or shoe, and thereby tend to enlarge the same.

A blow out patch embodying my invention is illustrated in the accompanying drawings, in which:—

Figure 1 is a perspective view; Fig. 2 is a transverse section with the patch in place within a tire applied to a rim, the inner tube being omitted; Fig. 3 is a transverse section on line 3—3 of Fig. 1; and Figs. 4, 5, 6 and 7 are sectional details.

Referring by reference characters to this drawing, 1 designates the body proper of the patch which is made of rubber and fabric, the latter in a plurality of layers, 2, depending in number on the weight or strength of patch desired or the size of the tire to which it is to be applied. The outer layers are also preferably of successively decreased length as clearly shown in the sectional view, so that the patch increases in thickness toward the center. One or more layers or plies of the fabric, preferably the inner one 4, is extended on both sides to form the marginal flaps 4, these flaps being impregnated with rubber.

The manner of applying the patch in case of a blowout will be clear from an inspection of Figs. 2, 4 and 8. In these two latter views, Fig. 4 is a longitudinal section on line 8—8 of Fig. 2 supposing a blowout to have occurred at that point, and Fig. 6 is a transverse section taken centrally through the blowout, the blowout being designated 5 in both views. In applying the patch, the body is placed around the inner tube (not shown), and with the center 6 of the patch opposite blowout opening 5. The body of the patch corresponds in size to the interior of the outer case or shoe, and the flexible edges 4 are passed around the edges of the case or shoe, so that when the shoe is applied to the rim 4', as indicated in Fig. 2, the patch is clamped between the flanges of the rim and the edges or beads of the shoe, and, of course, the inflation of the inner tube only serves to bind them the tighter.

The body of the shoe is made up in substantially the same manner as is the body of the tire, that is, of fabric which, in formation, is subjected to a tension equal to that commonly used in the manufacture of the fabric part of pneumatic tires, being vulcanized while in this tense condition. The result of this is that when the patch is placed within the upper shoe and the inner tube inflated with a proper pressure, the shoe retains its circular form, and will not bulge or project into the opening, as has heretofore been common with such non-metallic patching devices of which I am aware. Such projection or bulging is very objectionable, and where this takes place, produces results such as indicated in Figs. 5 and 7, which are sections similar to Figs. 4 and 6, such projection not only causing the tire to ride roughly or bump as it goes around, but causing excessive wear and enlargement of the ruptured part.

Having thus described my invention what I claim is:—

As a new article of manufacture, a tire repair device comprising a body portion composed of a plurality of layers of rubber coated fabric in a tense or stretched condition, and conforming in shape to the section of the tire, the inner layer of fabric being extended to form integral flexible flaps projecting from the opposite side edges of said body portion, substantially as described.

In testimony whereof I affix my signature, in presence of two witnesses.

ALBERT LINN MURRAY.

Witnesses:
 M. S. WEAVER,
 BESSIE D. RILEY.